No. 733,874. PATENTED JULY 14, 1903.
E. & J. P. RECK.
CATTLE STANCHION.
APPLICATION FILED AUG. 12, 1902.
NO MODEL. 2 SHEETS—SHEET 1.

Witnesses
J. P. Brett

Inventors
E. Reck
J. P. Reck
Attorneys

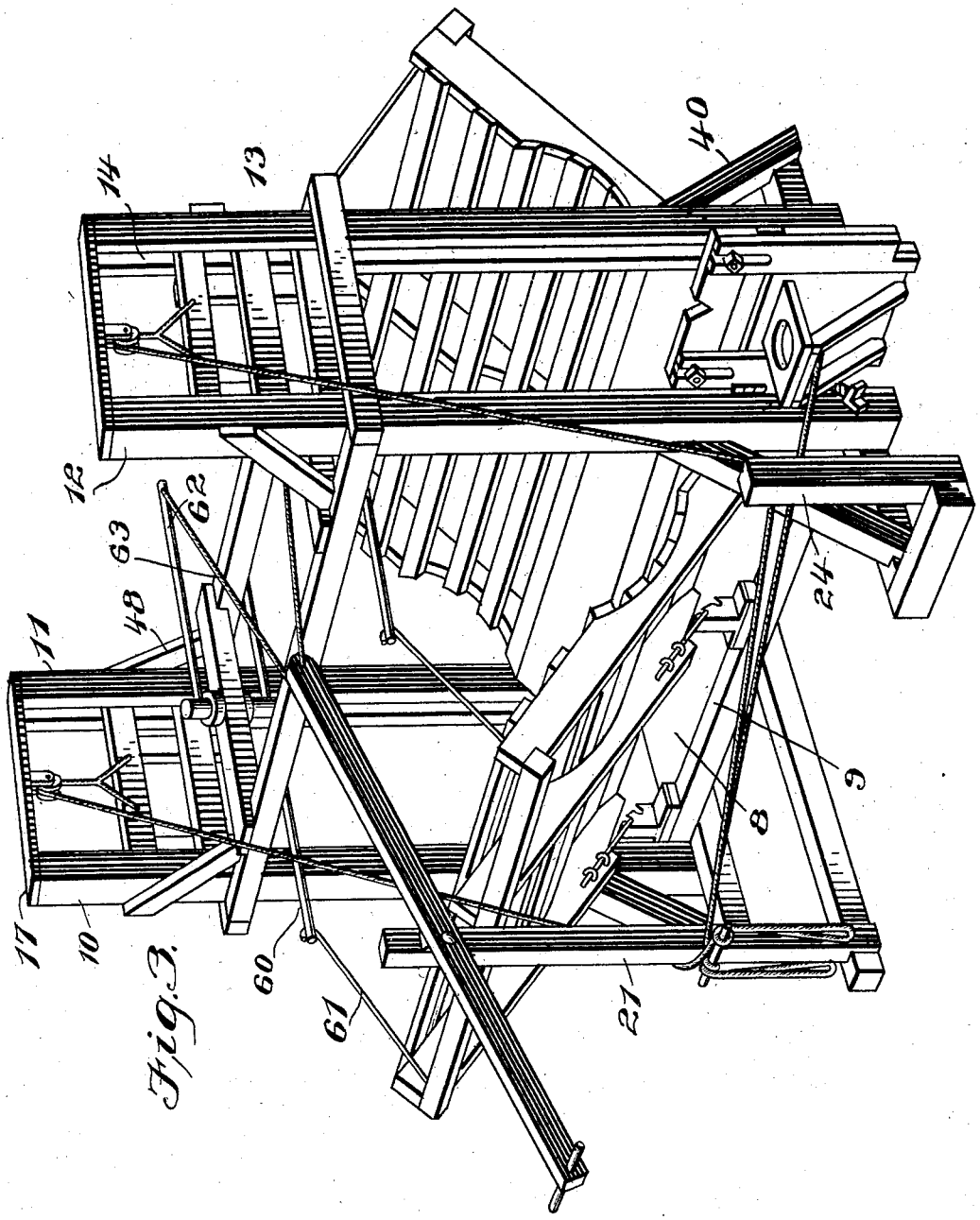

No. 733,874.

Patented July 14, 1903.

UNITED STATES PATENT OFFICE.

EMILE RECK AND JOHN P. RECK, OF CLAUDE, TEXAS.

CATTLE-STANCHION.

SPECIFICATION forming part of Letters Patent No. 733,874, dated July 14, 1903.

Application filed August 12, 1902. Serial No. 119,454. (No model.)

*To all whom it may concern:*

Be it known that we, EMILE RECK and JOHN P. RECK, citizens of the United States, residing at Claude, in the county of Armstrong, State of Texas, have invented certain new and useful Improvements in Cattle-Stanchions; and we do hereby declare the following to be a full, clear, and exact description of the invention, such as will enable others skilled in the art to which it appertains to make and use the same.

This invention relates to cattle-stanchions; and it has for its object to provide a stanchion that will be cheap and simple in construction, which will hold the cattle securely against movement, and which may be adjusted for cattle of different sizes.

A further object of the invention is to provide such a specific construction as will facilitate dehorning, branding, vaccinating, and other operations upon the cattle, other objects and advantages of the invention being understood from the following description.

Figure 2:
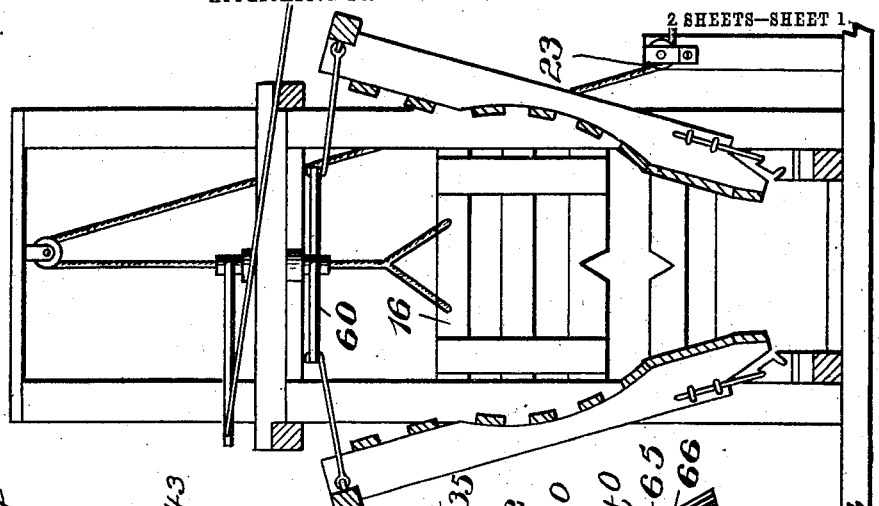
Figure 1:
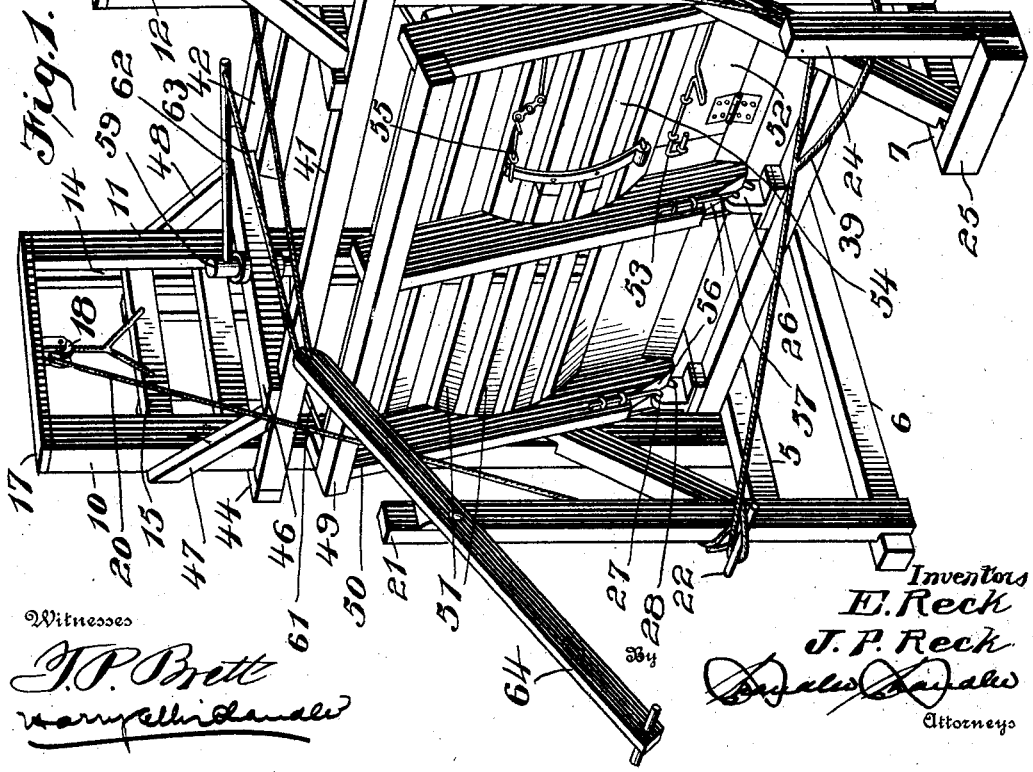

In the drawings forming a portion of this specification, and in which like numerals of reference indicate similar parts in the several views, Figure 1 is a perspective view showing the stanchion set up and ready to receive an animal. Fig. 2 is a transverse section taken vertically through the stanchion looking toward the front end. Fig. 3 is a perspective view of the stanchion with the side wings lowered and with the end gates raised.

Referring now to the drawings, the present stanchion comprises sills 5, 6, and 7, on which is mounted the floor 8, having longitudinal beams 9 at its sides, and at the corners of the floor and against the outer faces of the sills 5 and 7 are mounted uprights 10, 11, 12, and 13, the uprights at each end of the floor having each a groove 14 extending longitudinally of its inner face. In the grooves of the uprights 10 and 11 is mounted a sliding gate 15, while a similar sliding gate 16 is mounted in the upper portion of the grooves in the uprights 12 and 13. At the upper ends of each pair of uprights is fixed a cross-piece 17, having a pulley 18 suspended therefrom, and attached to the sliding gates and passed through these pulleys are cords 19 and 20 for raising and lowering the gates. An upright 21 is mounted near the end of the sill 6 and has a cleat 22, with which the cords may be engaged after the gates are raised, the cord 19 being passed through a direction-pulley 23 at the upper end of a post 24, secured to the lateral extension 25 of the sill 7. A gate is hinged to the lower end of the upright 12 in position to close the space between the uprights and below the sliding gate 16, this hinged gate comprising uprights 29 and 30 and connecting cross-pieces 31. The uppermost cross-piece 31 is connected to the uprights 29 and 30 by bolts 32, which work in slots in said uprights, so that said uppermost cross-piece 31 may be adjusted vertically. The uppermost cross-piece 31 and the lowermost cross-piece 33 of the gate 16 have notches 34 and 35, which lie one above the other, so that when an animal's neck is between the gates it will be engaged in the notches and the cross-piece 31 will act as a support for the neck of the animal. The hinged gate is held normally closed by means of the spring 36, attached to the gate and to the lock 37, and the gate is opened against the action of the spring by means of the cord 39, attached to the cord 19. Thus when the cord 19 is drawn both the hinged gate and the sliding gate 16 are opened, and when the cord is released the gates close.

The lower portions of the uprights 10, 11, 12, and 13 are provided with the slanting braces 40, which are secured at their lower ends to the sills 5 and 7, while at the upper ends of said uprights is a frame comprising the longitudinal beams 41 and 42, the cross-pieces 43 and 44 against the ends of the longitudinal beams and the outer faces of the uprights, and the additional cross-pieces 45 and 46 between the uprights, there being braces 47 and 48 connected to the uprights and to the beams 41 and 42, with their lower ends disposed against the cross-pieces 45 and 46.

Upon the beams 9 are mounted bearing-blocks 26, each of which has two bearing-recesses 27 and 28 therein, one in a higher plane than the other and the upper recess offset laterally in respect to the lower recess, the upper recesses of corresponding blocks at opposite sides of the floor of the stanchion being spaced farther apart than the lower recesses of the same block. The bearing-blocks are designed to receive side gates or side wings, each of which consists of the top beam 49, to which are connected cross-pieces 50, the edges of which at one side are curved inwardly and then outwardly, and against these edges are secured spaced slats 51. The slats of course follow the curvatures of the cross-pieces, and the concavities of the wings thus formed are designed to fit around the sides of the bodies of the animals that may be successively confined within the stanchion. The lower slats are secured in mutual contact, and in this lower portion of the wing at one side of the stanchion is a hinged gate or door 52, having a fastening device 53 for holding it closed, while above the door 52 and in the slatted portion of the wing is a second door 54, having also a latch mechanism 55 for holding it closed. The outer faces of the cross-pieces 50 at the lower ends of the latter are cut away, as shown at 56, and secured to the side faces of the cross-pieces are arms 57 or U-shaped bars, the bight or web portions of which are adapted for engagement with the slots 27 and 28 of the bearing-blocks interchangeably. When these web or bight portions of the U-shaped bars are in engagement with the upper bearing-recesses, the concavities of the wings and the doors of one of the wings above described are held at a greater elevation to correspond to tall cattle, while when the lower bearing-recesses are engaged the wings are in position to correspond to lower cattle. Furthermore, when the upper bearing-recesses are engaged the wings are spaced farther apart at their lower ends. It will be understood that the doors 52 and 54 permit of access to different parts of the animal to enable different operations to be performed. To permit of raising and lowering the side wings from one side of the stanchion, vertical shafts 59 are journaled in the cross-pieces 45 and 46, and through the lower portion of each of these shafts is passed a cross-bar 60, one end of which is connected with the adjacent end of a wing by means of a rod 61. At the upper end of each shaft 59 is an arm 62, and the arms 62 are connected by rods 63 with the lever 64, fulcrumed at the upper end of the post 21, so that a person may stand in position to operate the cords and lever to open the several gates and raise and lower the wings.

When an animal is to be operated upon, the wings are lowered and the gate 15 is raised and the animal is driven into the stanchion, the gates at the front end of the stanchion being closed. The gate 16 is raised, so that the animal may pass his head between the gate 16 and the hinged gate therebelow, after which the gate 16 is lowered, so that the neck of the animal is firmly held. The gate 15 is then lowered, and the wings are raised until they press with the proper degree of force against the animal. The animal being thus held securely, the proper door in the side wing may be opened and the desired operation performed, after which the hinged gate may be opened and the gate 16 may be raised to permit the animal to walk out from the stanchion.

When an animal is to be dehorned, it is secured in the stanchion in the same manner as above described, and the nose of the animal is thrust into the opening 65 in the table 66, secured to the front of the hinged gate. The gate 16 will prevent the animal from raising its nose from the opening, and the horns may be sawed or cut off at leisure.

It will be understood that in practice modifications of the specific construction shown may be made and that any suitable materials and proportions may be used for the various parts without departing from the spirit of the invention.

What is claimed is—

1. A cattle-guard having hinged side wings shaped to conform substantially to the form of the animal, said wings being vertically adjustable to suit animals of different heights, said wings having doors in its curved portions to give access to the animal in the stanchion.

2. A cattle-stanchion having hinged side wings shaped to conform substantially to the form of the animal, said wings being vertically adjustable to suit animals of different heights.

3. A cattle-stanchion comprising an inclosure having a hinged door at one end provided with a table having an opening to receive the nose of an animal, a vertically-movable gate constructed and arranged to rest upon the neck of an animal and hold its nose in the opening of the table, and means connected with both gates for swinging the former and raising the latter simultaneously.

4. A cattle-stanchion comprising an inclosure, a hinged gate provided with a table upon its outer face having an opening to receive the nose of an animal, means for holding the gate yieldably in closed position, a vertically-movable gate constructed and arranged to rest upon the neck of the animal and hold its nose in the opening of the table, and means connected with both gates for swinging the former and raising the latter simultaneously.

5. A cattle-stanchion comprising an inclosure having a table at one end provided with an opening to receive the nose of an animal, a vertically-movable gate constructed and arranged to rest upon the neck of the animal and hold its nose in the opening of the table, and a support for the neck of the animal arranged between said gate and table and adjustable toward and away from the table.

6. A cattle-stanchion comprising uprights having a frame secured to the upper portion thereof, side wings pivoted for movement in a vertical plane toward and away from each other, a vertical shaft at each end of the frame having arms projecting at opposite sides thereof, connections between the arms of each shaft and the adjacent ends of corresponding wings, an additional arm projecting from each shaft, and a lever connected with the last-named arms for operating them to actuate the wings.

In testimony whereof we affix our signatures in presence of two witnesses.

EMILE RECK.
JOHN P. RECK.

Witnesses:
H. M. KIGHT,
DAN CAVANAGH.